United States Patent [19] [11] 4,113,618
Koseki et al. [45] Sep. 12, 1978

[54] METHOD OF AND APPARATUS FOR SOLID-LIQUID SEPARATION

[75] Inventors: Yasuo Koseki; Sankichi Takahashi, both of Ibaraki; Azuma Nakaoka, Chiba, all of Japan

[73] Assignee: Hitachi, Ltd., Tokyo, Japan

[21] Appl. No.: 748,762

[22] Filed: Dec. 8, 1976

[30] Foreign Application Priority Data

Dec. 8, 1975 [JP] Japan .............................. 50-145085
Jan. 7, 1976 [JP] Japan ..................... 51-885

[51] Int. Cl.² ............................................... B01D 29/38
[52] U.S. Cl. ...................................... 210/82; 210/338; 210/411
[58] Field of Search ............... 210/82, 411, 457, 497 R, 210/499, 458, 338

[56] References Cited

U.S. PATENT DOCUMENTS

| 2,980,256 | 4/1961 | Nash | 210/411 X |
| 3,421,835 | 1/1969 | McCarty | 210/82 X |
| 3,695,443 | 10/1972 | Schmidt, Jr. | 210/457 X |
| 3,834,535 | 9/1974 | Portyrata | 210/82 X |
| 3,975,274 | 8/1976 | Nommensen | 210/82 |

Primary Examiner—William A. Cuchlinski, Jr.
Attorney, Agent, or Firm—Beall & Jeffery

[57] ABSTRACT

Method of and apparatus for separation of solids from a liquid employs an elastic sheet filter which has pores of diameter larger than an average diameter of the solid and smaller than the maximum diameter thereof. The liquid is filtered under pressure by a filtered residue layer developed on the sheet filter. Then liquid is rapidly introduced to the sheet filter portion from the reverse direction to liquid flow occured during the filtration of the liquid so that the sheet filter and filtered residue layer pressed during the filtration is rapidly pressed in the reverse direction, whereby the filtered residue layer is flaked out in the liquid and separated therefrom.

16 Claims, 12 Drawing Figures

FILTRATION

FLAKING OFF

METHOD OF AND APPARATUS FOR SOLID-LIQUID SEPARATION

BACKGROUND OF THE INVENTION

This invention relates to separation of solids from a liquid, particularly to method of and apparatus for separation by filtration with an elastic sheet filter, wherein the solid in the liquid can be condensed and separated from the liquid to collect in a layer.

In order to collect powdered solid particles such as powdered active carbon suspended in the liquid, known is a precipitation method employing condensing agent, wherein the suspended solid particles are separated and precipitated in a precipitation tank with the aid of the condensing agent. According to the method, in addition to a high treatment cost of the suspension due to using the condensing agent of a high cost, control of injection of the condensing agent into the suspension is difficult. Further a problem of secondary public pollution may be brought about since the remaining condensing agent flows in and joins the treated liquid.

On the other hand, various solid-liquid separating apparatus using a sheet filter have been developed. Most of them, however, are directed to carry out an object to raise filtered liquid or filtrate quality, and thereby it is difficult to condense and separate to collect the filtered residue, because a large quantity of washing water is employed to wash the filter and make the filtered residue very lean.

SUMMARY OF THE INVENTION

An object of the invention is to provide a method of and apparatus for separation of solids from liquid by an elastic sheet filter, in which filtered residue can be condensed and easily separated with filtration function maintained.

Another object of the invention is to provide method of and apparatus for separation of solids from liquid by an elastic sheet filter, in which filtered residue can be condensed and easily removed to collect with a simple construction without decrease of filtration performance.

Briefly stating, a feature of the present invention is that a filtered residue layer is formed or developed under pressure on an elastic sheet filter with suitable bores and the liquid surrounding the filtered residue layer is caused to rapidly flow in a reverse direction to the liquid flow occured during filtration whereby the filtered residue layer pressed in a filtration direction is rapidly pressed in the reverse direction so that the filtered residue layer is flaked out from the sheet filter.

The elastic sheet filter preferably has pores of larger diameter than an average diameter of solids contained in the liquid to be treated.

DESCRIPTION OF THE PREFERRED EMBODIMENTS

Before description of embodiment of the present invention, a principle of solid-liquid separation by a sheet filter according to the present invention will be explained. The solid-liquid separation comprises two steps one of which is filtration, the other is separation of filtered residue or filter cake adhered to the sheet filter. In the filtration, when a liquid including solid particles such as powdered active carbon flow to the sheet filter, initially the solid particles smaller than pores made in the filter material pass through the filter material, and the solid particles of larger diameter than the pore diameter are caught by the sheet filter thereon. Afterwards the larger diameter solid particles caught on the filter material act as additional filter material for filtration of the smaller solid particles, which results in formation of a filtered residue layer with progressing filtration. As the filtered residue layer develops, the quantity of filtrate decreases and filtering pressure raises, so that the filtered residue layer is pressurized to make a strong flake. That is, the step of filtration includes pressurization and condensation of the filtered residue layer.

In the separation step, by bringing counter or back liquid flow to the filtered residue layer under compression in the liquid due to pressure, with the pressure applied to the filtered residue layer from the solid-liquid side being released, the filtered residue layer expands and sucks rapidly the surrounding liquid so that movement of the liquid is brought about between the filtered residue layer and the sheet filter. The separation of the filtered residue layer is carried out by the counter liquid flow.

In case of the separation, since the filtered residue layer absorbs liquid surrounding the layer, the filtered residue layer becomes adhesive and is not easily destroyed, so that the filtered residue layer is flaked off. The flaking off is carried out by application of counter pressure to the filtered residue layer. Therefore it is necessary to dispose of the whole filtered residue layer in the liquid. Further it is necessary that pore size of the sheet filter is suitable, that is, larger than an average diameter of solid particles to be filtered and smaller than the maximum diameter thereof, and that uniform back pressure is applyed to the filtered residue layer.

Figure 9:
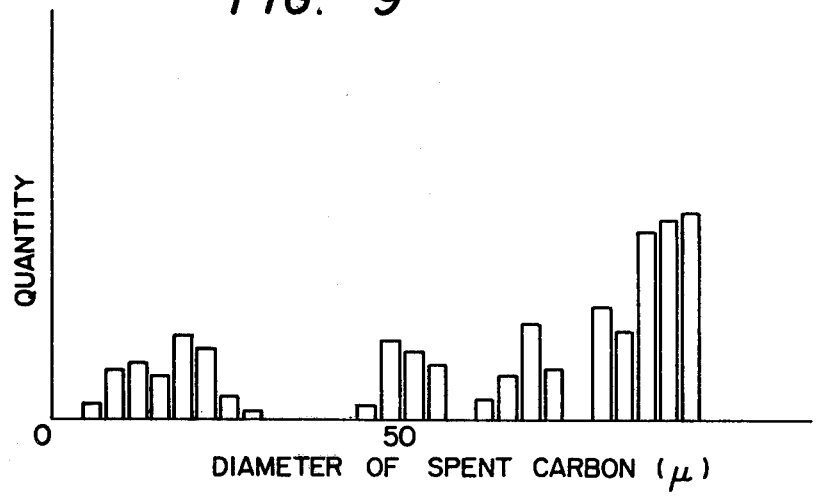
FIG. 9 is a graph showing a grain size distribution of carbons.

For example, for separation of powdered active carbon of grain diameter smaller than 100 meshes (average grain diameter 20μ), the solid-liquid separation apparatus according to the present invention was used, as the results, suitable mesh of the sheet filter was found in a range of 100 meshes to 350 meshes (100μ~40μ). The sheet filter smaller than 150 meshes necessitates a long time in developing filtered residue layer on the sheet filter, and in case of the sheet filter larger than 350 meshes, developing of the filtered residue is early but it is easily destroyed when flaking off. An example of grain distribution of active carbon is shown in FIG. 9, the sheet filter with pores of 62μ diameter was used for the separation of such an active carbon.

Figure 1:
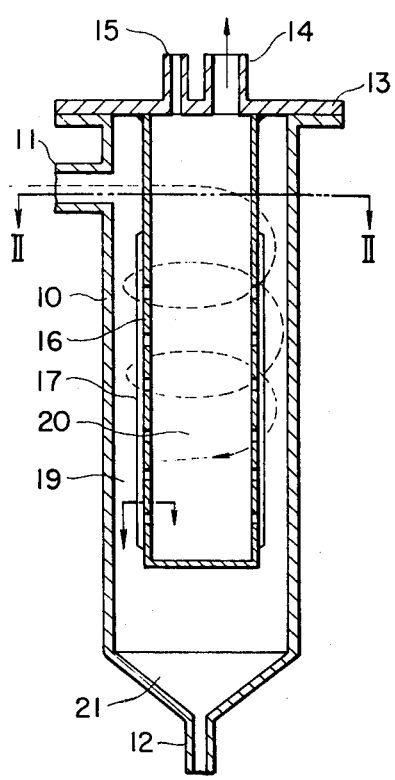
FIG. 1 is a sectional front view showing an embodiment of a solid-liquid separation apparatus according to the present invention.
Figure 2:
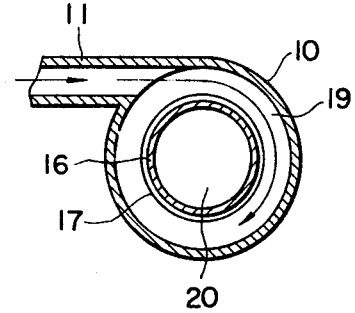
FIG. 2 is a section view of the solid-liquid separation apparatus taken along a line II—II of FIG. 1.
Figure 3:
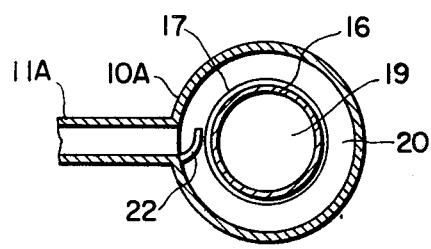
FIG. 3 is a section view of a modification of the solid-liquid separation apparatus shown in FIG. 2.
Figure 4:
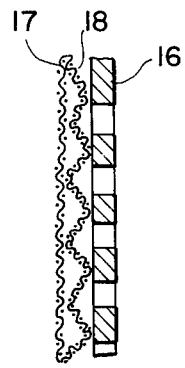
FIG. 4 is an enlarged section view taken along a line IV—IV of FIG. 1.

Next, an embodiment of the present invention will be described hereinafter in detail referring to FIGS. 1 – 4. In FIG. 1 a section view of solid-liquid separation apparatus is shown. The apparatus comprises a cylindrical casing 10 which has an inlet 11 for liquid to be treated in an upper portion thereof and an outlet 12 for filtered residue or filter cake at the bottom thereof, a lid 13 tightly mounted on the upper end of the casing 10, which has an outlet 14 for filtrate and an inlet 15 for liquid used for separation of filter cake, a foraminated cylinder 16 with the closed end disposed in the casing 10 so as to define an annular space 19 between the casing 10 and the cylinder 16, with the upper end tightly secured to the lid 13, and a sheet filter 17 such as a net, or a filter cloth. The inlet 11 is arranged tangentially to introduce circularly the liquid into the annular space 19, as shown wherein in FIG. 2. In FIG. 3 a modification of FIG. 2 is shown an inlet 11A is radially mounted on a casing 10A and a guide 22 is provided between the casing 10A and the filter 17 thereby causing the liquid entered at the inlet 11A to whirl. The cylinder 16 has a plurality of holes in the portion lower than the inlet 11. The sheet filter 17 is secured to the cylinder 16, surrounding all the holes. The filter net 17 is supported by a spacer of net 18 disposed between the cylinder 16 and the filter net 17. The spacer 18 is corrugated and meshes of the corrugated spacer 18 are more coarse than those of the filter net 17. The hole size of the cylinder 16 is further larger than that of the corrugated spacer 18.

Figure 5A:
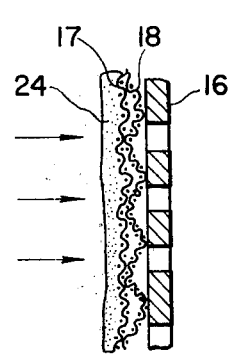
FIG. 5a and FIG. 5b are enlarged section views taken along a line IV—IV of FIG. 1, which views are for explanation of filtration and flaking off.
Figure 5B:
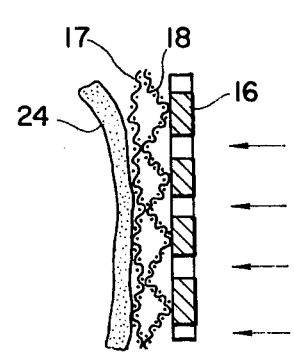

The spacer 18 serves for separation of filter cake mounted on the filter net 17. Before filtration a proper space between the filter net 17 and the spacer 18 is kept, but as the filtration progresses, the filter net 17 deforms as shown in FIG. 5a by filtration pressure so that the space decreases. The deformation of the filter net 17 becomes larger as the filtration progresses. When the filtration is stopped, filtration pressure disappears. Therefore the filter net 17 is rapidly restored in the original form by the disappearance of the filtration pressure and counter flow of liquid which is introduced through the inlet 15 to separate the filter cake. By the movement of the filter net 17 and the counter liquid flow applying to the filter cake layer, the filter cake layer is flaked off. That is, disappearance of the filtration pressure effects a plurality of very small spaces between the filter cake layer and the filter net 17 to make separation easy, and the counterflow is very rapidly applied to the filter cake layer, which makes it easy to separate the filter cake layer from the filter net 17 in flakes as shown in FIG. 5b. In order to advance the effect of separation, it is necessary to rapidly restore the deformed filter net 17 in the original form. The filter net 17 or/and the spacer 18 is preferably of elastic material, for example, wire nets are used for both of them.

Figure 6:
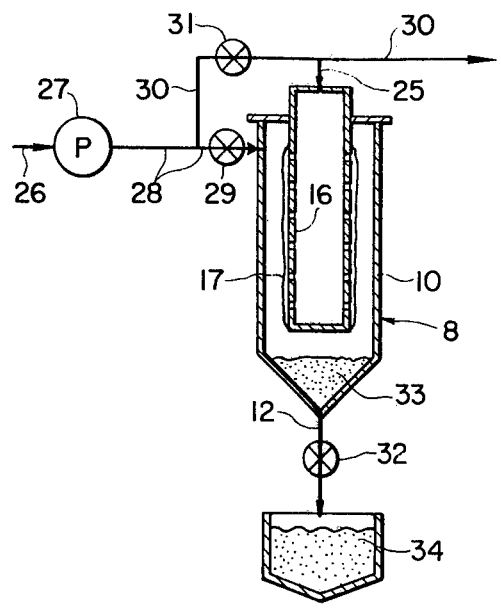
FIG. 6 is a sectional front view of another embodiment of a solid-liquid separation apparatus.

In FIG. 6, shown is a solid-liquid separation apparatus according to the present invention, which apparatus is the same as the one in FIG. 1 except that it has an outlet 25 for filtrate serving as an inlet for introducing separation liquid in addition to its function of outlet for filtrate.

The apparatus is provided with pipings. A pump 27 is connected to a casing 10 of the apparatus through a pipe 28 with valve 29. A pipe 30 with valve 31 branched off from the pipe 28 between the pump 27 and the valve 29 communicates with the outlet 25 at its intermediate portion. A precipitation chamber 33 defined in the bottom of the apparatus communicates with a tank 34 through pipe 12 with valve 32. When water 26 to be treated is filtered, the valve 29 is opened, the valves 31 and 32 closed, and then the water 26 is delivered to the casing 10 by the pump 27 through the pipe 28 and the valve 29. The water is filtered at the filter net 17, the filtrate goes out passing through the supporter 16, the outlet 25, and the pipe 30, and filter cake adheres to the filter net 17. In case of separation of the filter cake, at first the valve 29 is closed, and then the valves 31 and 32 are opened to bring about counterflow or back flow in the apparatus, whereby the filter cake receives the counterflow to flake out from the filter net 17 and at the same time precipitated filter cake is caused to flow into the tank 34 through the valve 32.

Figure 7:
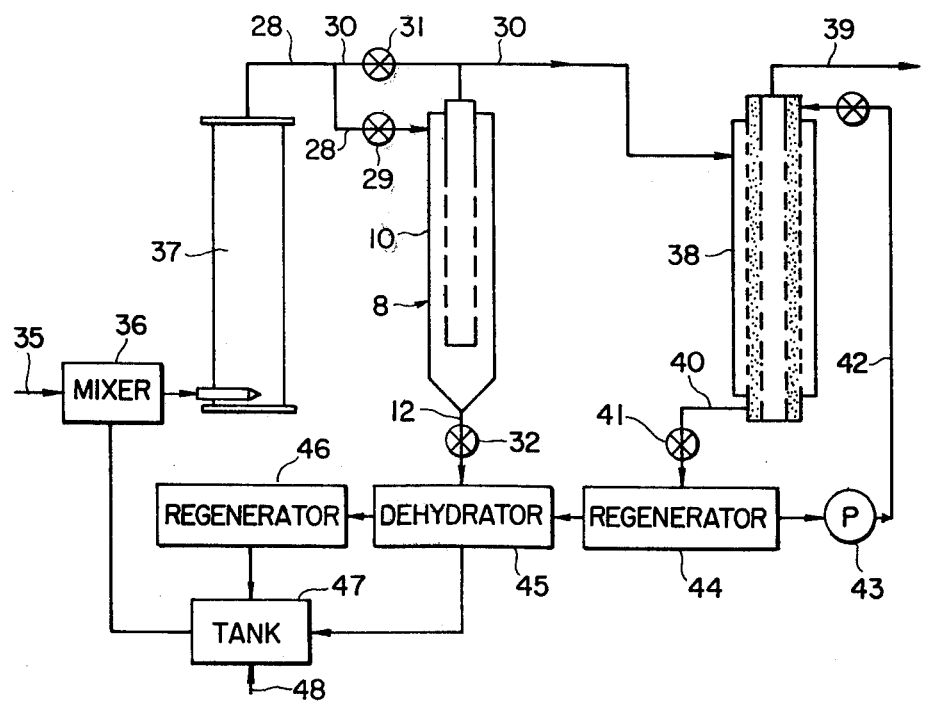
FIG. 7 is a schematic diagram of an embodiment of a water treatment apparatus employing a solid-liquid separation apparatus according to the present invention.

In FIG. 7, water treatment apparatus including the solid-liquid separation apparatus is shown. The water treatment apparatus employs powdered active carbon.

Waste water 35 is mixed with the powdered active carbon in an adsorption tower 37, wherein the waste water is treated by adsorption. The active carbon is carried to the casing 10 of the solid-liquid separation apparatus through a pipe 28 and open valve 29, wherein the active carbon is condensed and removed from the suspension. Filtrate including the remaining active carbon is sent to a filtration apparatus 38 comprising a grain filter such as a sand filter to filter the remaining active carbon. Filtrate 39 from the apparatus 38 is taken out as a treated water.

The active carbon which is condensed, flaked off, and passed into a dehydrator 45 through a passage 12 and a valve 32 is dehydrated there to be sent to a regenerator 46 in which the active carbon is heated for regeneration. The regenerated powdered active carbon is slurryed in the tank 47 by adding for example water from the dehydrator 45. The slurry in the tank 47 is sent to the mixer 36 with supplementary active carbon 48 supplied in the tank 47 for supplementation of the active carbon shortage to serve again for adsorption.

The active carbon filtered in the filtration apparatus 38 is passed through pipe 40 and valve 41 into regenerator 44 with the filter material or sand, where the carbon is to be separated from the sand. The separated powdered active carbon is sent to the dehydrator 45, and the sand is sent to the filtration apparatus 38 by pump 43 through pipe 42.

Figure 10:
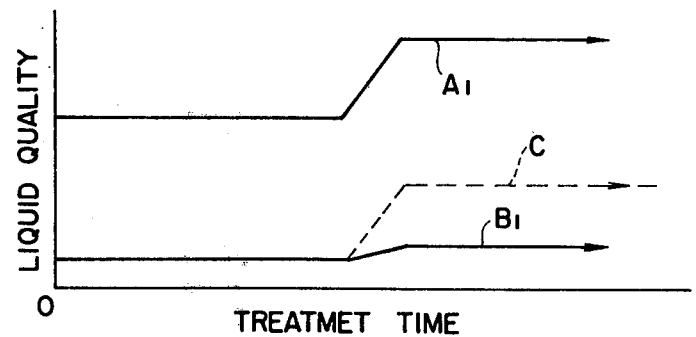
FIG. 10 is a graph showing a relation between liquid quality and treatment time.

Thus the water treatment apparatus employing the solid-liquid separation apparatus according to the present invention has an effect to be able to respond to water quality change which is a defect in a conventional water treatment apparatus. The conventional water treatment apparatus comprises an adsorption tank, a tank for separation of powdered active carbon using a condensing agent, and a filtration tower employing filter material such as sand. Accordingly, when the water to be treated is changed in its quality, the amount of powdered active carbon to be added must be changed in response to the change of the water quality. However, the water treatment apparatus employing the solid-liquid separation apparatus according to the present invention can minimize the effect of water quality change of the treated water, since even though the water quality to be treated changes, adsorption progresses even during passing of the water to be treated through a powdered active carbon layer, that is filter cake or filtered residue layer. In FIG. 10, $A_1$ indicates water quality change of the water to be treated; $B_1$, water quality of treated water by the water treatment apparatus employing the separation apparatus according to the present invention; C, water quality change of the water treated by the above-mentioned conventional water treatment apparatus.

Figure 8:
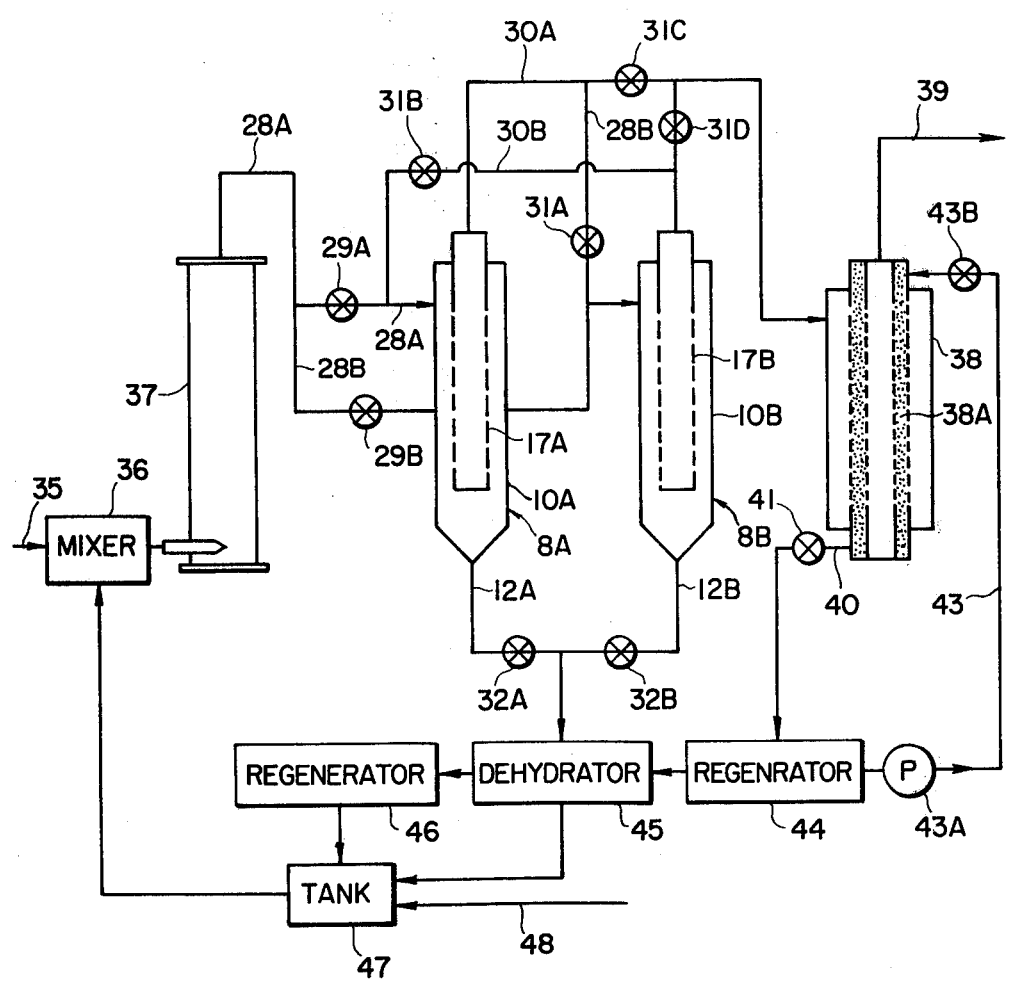
FIG. 8 is a schematic diagram of another embodiment of a water treatment apparatus employing a solid-liquid separation apparatus according to the present invention.

As for separation performance of the solid-liquid separation apparatus according to the present invention, at the start of operation of the apparatus it is not sufficient because of the mesh of the filter net being larger than the average diameter of solid particles to be separated such as active carbon and because of insufficient developing of precoating layer, that is filtered residue layer on the filter net. The above defect is improved in the following operating method. The method is carried out by preparing the solid-liquid separation apparatus as shown in FIG. 8. The apparatus of FIG. 8 has two of the apparatus shown in FIG. 1 or 6 and is constructed such that the solid-liquid separation apparatus 8A and 8B are used in series and in parallel to each other by operation of valves installed therein but otherwise the apparatus in FIG. 8 is the same in construction as the one in FIG. 7. Only the different construction from the one shown in FIG. 7 will be described hereinafter. An adsorption tower 37 communicates with a solid-liquid separation apparatus 8A through a pipe 28A with valve 29A connected therebetween. The apparatus 8A is connected to a filtration apparatus 38 by a pipe 30A with valve 31C. The adsorption tower 37 further communicates with a solid-liquid separation apparatus 8B through a pipe 28B with a valve 29B connected to the pipe 28A between the adsorption tower 37 and the valve 29A. The apparatus 8B is connected with the filtration apparatus 38 by a pipe 30B with a valve 31D connecting between the apparatus 8B and the pipe 30A between the valve 31C and the filtration apparatus 38. The pipe 28A is connected to the pipe with the valve 31D between the apparatus 8B and the valve 31D through a pipe 30B with a valve 31B. The pipe 28B branch from the pipe 28A is also connected with the pipe 30A between the apparatus 8A and the valve 31C, and this branch has a valve 31A.

In the solid-liquid separation apparatus is as follows:

STEP 1. The operation, operation of the apparatus starts with the valves 29A, 31B, 32A, and 32B, 31C and 31A each closed. Water including active carbon to be treated is directed only to the separator 8B to make a precoating layer on a filter net 17B. STEP 2, next with the valve 29B closed and the valves 29A and 31A opened, the water from the adsorption tower 37 is directed to pass through the separators 8A and 8B in series. The separator 8A is not precoated with the active carbon included in the water as yet so that separation preformance is not enough, which results in flowing out most of the active carbon. But the water is filtered by the precoated separation apparatus 8B, whereby the amount of active carbon flowing into the filtration apparatus 38 is very small. While the separation apparatus 8A is progressed to precoat its filter net 17A, the condensing layer or filter cake layer is developing in separation apparatus 8B to increase filtration resistance, and when this resistance becomes excessive, it will be desirable to remove the filter cake layer from apparatus 8B.

STEP 3

The operation to remove the filter cake layer from net 17B of apparatus 8B is carried out by rapid closing of the valve 31A and rapid opening of valves 31C and 32B, whereby filtrate from the apparatus 8A flows into the apparatus 8B to cause a counterflow of the filtrate through the filter net 17B and the condensing layer is flaked out and taken off into the dehydrator 45 through the valve 32B.

STEP 4

After completion of the flaking out, the valves 29A, 31D and 32B are closed, and the valves 29B and 31B, opened, whereby active carbon water from the adsorption tower 37 pass through the valve 29B, the apparatus 8B, the valve 31B and the apparatus 8A and then flows into the filtration apparatus 38 through the valve 31C. In the apparatus 8B, a filter cake layer is not developed to begin with so that most of the active carbon flows out of the apparatus 8B, but is filtered by the precoated apparatus 8A, whereby the active carbon flowing into the filtration apparatus 38 is very small. While apparatus 8B is gradually precoated, at the same time the filter cake layer in the apparatus 8A is developed to be thick thereby increasing filtration resistance, and after the resistance becomes undesirable then the apparatus 8A goes into operation of flaking out of the filter cake layer.

STEP 5

The operation of removing the filter cake from apparatus 8A is carried out by closing the valve 31B and rapidly opening the valve 31D and 32A, whereby filtrate from the apparatus 8B flows into the apparatus 8A through the valve 31D and 31C to cause the water surrounding the filter cake layer to flow in the counterdirection to the water flow occured during the filtration. By the counterflow the filter cake layer is flaked off and discharged into the dehydrator 45 through the valve 32A.

STEP 6

After the filter cake has been removed from apparatus 8A, the valves 32A, 29B, 31C are closed and the valves 29A and 31A are opened, whereby flow passage that the water containing active carbon flows in the apparatus 8A and 8B in the mentioned order is established, which is the same flow as obtained with Step 2. It is seen that for continuous operation, Steps 3 through 6 would be repeated in order as often as desirable. Thus by operation of the valves 29A to 32B, the precoat layers developed on the filter nets of the apparatus 8A and 8B are alternately flaked off and at the same time part of the water to the filtration apparatus 38 is caused to flow in the reverse direction to decrease a load of the filtration apparatus 38. The alternately removed powdered active carbon is slurryed in the tank 47 with water from the dehydrator 45 and sent to the mixer 36 with supplementary carbon, after dehydrated by the dehydrator 45 and regenerated by the regenerator 46.

Figure 11:
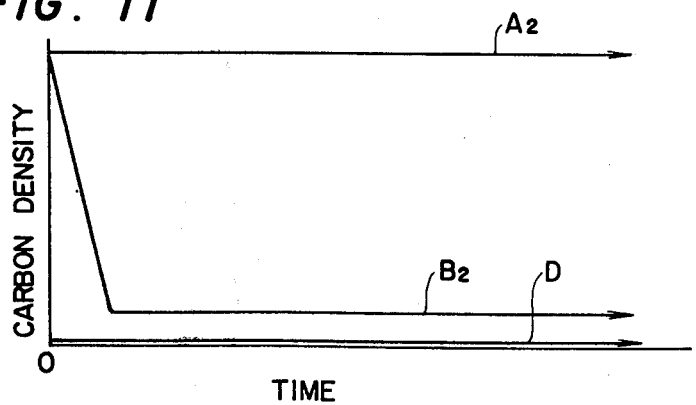
FIG. 11 is a graph showing a relation between carbon density and time of treatment.

Graph in FIG. 11 shows filtration performance by the water treatment apparatus of FIG. 8, in which $A_2$ denotes active carbon density in the water at the outlet of the absorption tower 37; $B_2$, active carbon density in the water treated by the apparatus 8A and 8B; and D, active carbon density at outlet of the filtration apparatus 38. $B_2$ is close to D to the extent that they are substantially the same. As shown by $B_2$ in FIG. 11, water quality change occures only in short period until first completion of the precoating layer, i.e. completion of STEP 1. After the completion of the precoat layer according to STEP 1, no water quality change occures because one of two the apparatus 8A and 8B is always precoated and the precoated layer provides filtration.

While a preferred embodiment has been shown in detail for purposes of illustration and the importance of the details, further embodiments, modifications and variations are contemplated according to the broader aspects of the present invention, all is determined by the spirit and scope of the following claims.

What is claimed is:

1. Method of treating a process fluid consisting of liquid and suspended solid particles for separation of the solid particles from the liquid with elastic sheet filter comprising steps of:

providing the elastic sheet filter with a plurality of pores for filtration formed such that the pore diameter is larger than an average diameter of the solid particles and smaller than the maximum diameter of the solid particles and an original shape prior to filtration;

passing the process fluid to the sheet filter so that the liquid and particles smaller than the average pass through the sheet filter to develope a pressurized filter residue layer of the solid particles that are larger than average to be held on the sheet filter, thereby increasing filtration with the filtered residue layer of the solid particles that are larger than average so as to thereafter filter out both the solid particles that are smaller and larger than average as the liquid continues to pass through the sheet filter;

thereafter continuing the passing of the process fluid to the sheet filter and the filtering out of substantially all of both the larger and smaller than average particles with the filtered residue layer to increase the filter pressure and correspondingly elastically deform the elastic sheet filter from its original shape until the fluid flow resistance reaches an undesirable level; and thereafter, before any further filtering, stopping said passing of the process fluid to and the liquid through the sheet filter when the fluid flow resistance reaches the undesirable level so that the elastic sheet filter will return to its original shape and causing the liquid surrounding the filtered residue to flow in the counter direction to liquid flow occurred during filtration of the liquid to separate the filtered residue from the elastic sheet filter in large flakes.

2. Method as defined in claim 1, wherein in said step of stopping and causing, part of the liquid to be treated is introduced to the filtered residue layer from the backside of the sheet filter to cause the liquid surrounding the filtered residue layer to flow in the counterdirection to the liquid flow occured during the filtration of the liquid and impacts the filtered residue layer to flake out.

3. Method of separation of solid particles in a liquid therefrom with elastic sheet filter comprising steps of preparing at least two first and second sheet filters with pores disposed apart from each other, the pores having larger diameter than an average diameter of the solid particles and smaller diameter than the maximum diameter thereof;

passing the liquid through only the first sheet filter to develop a filtered residue layer on the sheet filter;

stopping the passing of the liquid through the first sheet filter while keeping the filtered residue layer in the liquid;

passing the liquid to be filtered through the second sheet filter and the first sheet filter in mentioned order to develop a filtered residue layer on the second filter and filter the liquid passing through the second sheet filter with the filtered residue developed on the first sheet filter;

stopping the passing of the liquid through first sheet filter while keeping the filtered residue layer in the liquid;

separating the filtered residue layer on the first sheet filter therefrom by causing the liquid surrounding the filtered residue layer to flow in the counterdirection to the liquid flow occured during the filtration whereby filtered residue layer is flaked out due to receiving impact of the liquid flow;

passing the liquid to be filtered through the first sheet filter and the second sheet filter in order for filtration;

stopping the passing of the liquid through the second sheet filter; and separating the filtered residual layer on the second sheet filter therefrom by causing the liquid surrounding the filtered residue layer to flow in the counterdirection to the liquid flow occured during the filtration.

4. Method as defined in claim 3, wherein in the separating of the filtered residue layer on the first sheet filter therefrom, the liquid flow in the counterdirection to the liquid flow occured during the filtration is carried out by rapidly introducing the liquid passed through the second sheet filter to the backside portion of the first sheet filter, and in the separating of the filtered residue layer on the second sheet filter therefrom, the liquid flow in the counterdirection to the liquid flow occured during the filtration is carried out by rapidly introducing the liquid passed through the first sheet filter to the backside portion of the second sheet filter.

5. Apparatus for separating solid particles in a liquid therefrom comprising:

elastic sheet filter means with pores of larger diameter than an average diameter of solid particles to be separated from a liquid and smaller than the maximum diameter thereof;

means for supplying the liquid to the elastic sheet filter means to pass the liquid through so that a filtered residue layer is developed on the elastic sheet filter means;

means mounting said elastic sheet filter means so that it will elastically deform from its original shape before filtering as the filtered residue layer is developed and increases the filter back pressure, and so that with termination of the supplying of the liquid and release of back pressure, said elastic sheet filter means will return to its original shape and start to flake off the residue layer; and means for introducing a liquid to the elastic sheet filter means from the reverse direction to the liquid flow occurred during the filtration to completely separate the filtered residue layer from the elastic sheet filter means and complete the flaking off of the residue layer.

6. Apparatus as defined in claim 5, wherein the elastic sheet filter means comprises an elastic filter net and means for supporting the filter net.

7. Apparatus as defined in claim 6, further including an elastic spacer between the filter net and the means for supporting the filter net.

8. Apparatus for separating solid particles in a liquid therefrom comprising:
- a cylindrical casing with an open upper end and a closed bottom end, which casing is provided with an inlet for liquid having solid particles therein to be separated and an outlet for the filtered residue of solid particles;
- a lid tightly secured to the casing for closure of the upper end of the casing;
- cylindrical elastic sheet filter means with pores of larger diameter than an average diameter of the solid particles and smaller than the maximum diameter thereof, disposed coaxially of and in the cylindrical casing with the upper end of the cylindrical sheet filter means tightly secured to the lid member so that part of the lid member presents a part of the cylindrical sheet filter means, the cylindrical sheet filter means having liquid passage means at its upper portion thereof;
- means mounting said elastic sheet filter means so that it will elastically deform from its original shape before filtering as the filtered residue layer of solid particles is developed on the elastic sheet filter means and increases the filter back pressure, and so that with termination of the supplying of liquid and release of back pressure, the elastic sheet filter means will return to its original shape and start to flake off the residue layer; and
- means for reversing the flow of liquid through said elastic sheet filter means after the termination of the supplying of liquid and release of back pressure so as to complete the flaking off of the residue layer.

9. Apparatus as defined in claim 8, wherein the cylindrical elastic sheet filter means comprises a cylindrical supporting member tightly secured to the lid member having holes on the cylindrical portion thereof, and elastic filter net means wound on the supporting member.

10. Apparatus as defined in claim 9, wherein an elastic spacer forming mesh is disposed between the elastic filter net means and the cylindrical supporting member.

11. Apparatus as defined in claim 10, wherein the elastic spacer is corrugated.

12. Apparatus as defined in claim 10, wherein the inlet for liquid provided on the casing is arranged tangentially of the casing so that the liquid introduced in the casing whirls in an annular space defined by the casing and the elastic sheet filter net.

13. Apparatus as defined in claim 10, wherein the inlet for liquid provided on the casing is arranged radially of the casing, and includes guide means for changing the radial direction of the entering liquid to a tangential direction so that the liquid introduced in the casing whirls in an annular space defined by the casing and the elastic sheet filter net.

14. Apparatus as defined in claim 10, further including a first passage means with valve means connected to the inlet for liquid to be filtered; a second passage means with valve means connected to the outlet for filtered residue; and a third passage means with valve means the one end of which is connected to the first passage means upperstream of the valve means and the other end connected the passage provided in the upper portion of the sheet filter means.

15. Apparatus as defined in claim 9, wherein the elastic filter net means is made of wires.

16. Apparatus for separating solid particles in a liquid therefrom comprising
- at least two first and second elastic sheet filter means disposed apart from each other, each of the elastic sheet filter means having pores larger than an average diameter of solid particles to be separated from a liquid and smaller than the maximum diameter thereof;
- means for supplying the liquid to be filtered to the first sheet filter means to pass the liquid therethrough;
- means for discharging liquid after passing through the first sheet filter means out of the apparatus;
- means for stopping the supply of the liquid to the first sheet filter means;
- means for supplying the liquid to be filtered to the first sheet filter means after passing the liquid through the second sheet filter means;
- means for stopping the supply of the liquid to the first sheet filter means and for introducing the liquid passed through the second sheet filter means into the backside of the first sheet filter means and at the same time discharging liquid including filtered residue separated from the first sheet filter means out of the apparatus;
- means for stopping the supply of the liquid to the second sheet filter means;
- means for introducing the liquid to the second sheet filter means after passing the liquid through the first sheet filter means; and
- means for stopping the supply of the liquid to the second sheet filter means and for introducing the liquid passed through the first sheet filter means into the backside of the second sheet filter means and at the same time discharging liquid including filtered residue separated from the second sheet filter means out of the apparatus.

* * * * *